US009057650B2

(12) United States Patent
Trukenmueller

(10) Patent No.: US 9,057,650 B2
(45) Date of Patent: Jun. 16, 2015

(54) METHOD FOR CORRECTING PERMANENT CALIBRATION AND FORCE-MEASURING BALANCING MACHINE

(71) Applicant: Schenck RoTec GmbH, Darmstadt (DE)

(72) Inventor: Kai Trukenmueller, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 327 days.

(21) Appl. No.: 13/723,547

(22) Filed: Dec. 21, 2012

(65) Prior Publication Data

US 2013/0186170 A1 Jul. 25, 2013

(30) Foreign Application Priority Data

Jan. 23, 2012 (DE) .......................... 10 2012 100 531

(51) Int. Cl.
| | |
|---|---|
| *G01H 1/06* | (2006.01) |
| *G01H 13/00* | (2006.01) |
| *G01H 1/08* | (2006.01) |
| *G01L 5/00* | (2006.01) |
| *G01M 1/02* | (2006.01) |
| *G01M 1/08* | (2006.01) |

(52) U.S. Cl.
CPC ................ *G01L 5/0066* (2013.01); *G01M 1/08* (2013.01); *G01M 1/02* (2013.01)

(58) Field of Classification Search
CPC ..... G01H 1/003; G01H 13/00; G01M 13/045; G01M 13/028; G01M 1/00; G01M 1/08; G01M 1/16

USPC .......................... 73/1.01, 1.14, 579, 659, 660
See application file for complete search history.

(56) References Cited

U.S. PATENT DOCUMENTS

| | | | | |
|---|---|---|---|---|
| 4,750,361 | A | * | 6/1988 | Bandhopadhyay ............. 73/462 |
| 5,257,541 | A | | 11/1993 | Trommer et al. |
| 5,406,846 | A | * | 4/1995 | Gasch et al. .................... 73/462 |
| 5,481,912 | A | * | 1/1996 | Himmler ........................ 73/460 |
| 6,553,837 | B1 | * | 4/2003 | Lysen ............................. 73/579 |
| 6,618,646 | B1 | * | 9/2003 | Dyer ............................. 700/279 |

(Continued)

FOREIGN PATENT DOCUMENTS

| | | |
|---|---|---|
| CN | 1 02 175 394 | 9/2001 |
| DE | 40 28 656 | 3/1992 |

OTHER PUBLICATIONS

Schneider, Hatto: Auswuchttechnik, 7. Auflage, Verlag Springer, 2007, S. 148-150, ISBN 978-3-540-49091-3 (with English Abstract).

*Primary Examiner* — David A Rogers
(74) *Attorney, Agent, or Firm* — Collard & Roe, P.C.

(57) ABSTRACT

Using a force-measuring balancing machine (1), the empirically determined permanent calibration is corrected in that the resonant frequencies ($\omega_1$) of the rotor (2) to be balanced are calculated, in a translatory direction and ($\omega_2$) in a rotational direction, from the mass ($m_R$) of a rotor (2) to be balanced, which is mounted in the balancing machine (1), the co-oscillating mass ($M_s$) of the bearing supports (3), the rigidity (c) of the bearing supports (3) and the spacing (L) of the rotor bearings, and a frequency response calculated from the resonant frequencies ($\omega_1$, $\omega_2$) and the frequency ($\Omega$) of the rotor (2) is introduced to the permanent calibration.

4 Claims, 1 Drawing Sheet

(56) References Cited

U.S. PATENT DOCUMENTS

| | | | |
|---|---|---|---|
| 7,252,000 B2* | 8/2007 | Care et al. | 73/462 |
| 2004/0034483 A1* | 2/2004 | Sonnichsen et al. | 702/56 |
| 2007/0062278 A1* | 3/2007 | Dyer | 73/458 |
| 2009/0070050 A1* | 3/2009 | Baehr et al. | 702/56 |
| 2009/0293613 A1* | 12/2009 | Bucher et al. | 73/462 |
| 2011/0067493 A1* | 3/2011 | Baehr et al. | 73/462 |
| 2011/0197672 A1* | 8/2011 | Peinelt et al. | 73/470 |
| 2011/0226055 A1* | 9/2011 | Rogalla et al. | 73/468 |
| 2014/0123753 A1* | 5/2014 | Breitwieser et al. | 73/483 |

* cited by examiner

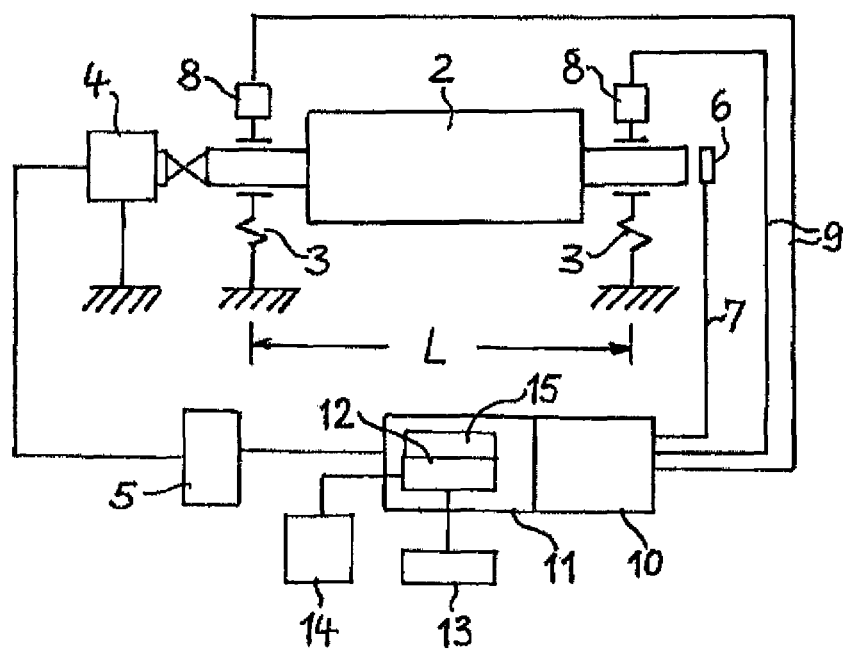

METHOD FOR CORRECTING PERMANENT CALIBRATION AND FORCE-MEASURING BALANCING MACHINE

CROSS REFERENCE TO RELATED APPLICATIONS

Applicants claim priority under 35 U.S.C. §119 of German Patent Application No. 10 2012 100 531.1 filed Jan. 23, 2012.

FIELD OF THE INVENTION

The invention relates to a method for correcting the empirically determined permanent calibration of a force-measuring balancing machine and to a force-measuring balancing machine using said method.

The relationship between unbalance and oscillation is established empirically in each balancing machine by means of calibration. When measuring unbalance in the subcritical region, for which force-measuring balancing machines are used, the inertial forces are negligible compared with the resilience, thus rendering it possible for the rotor properties of mass and moment of inertia and the centre of gravity of the rotor with respect to its bearing to be left unconsidered when measuring unbalance. Permanent calibration of hard-bearing, force-measuring balancing machines is thus possible, independently of the mechanical properties of the fitted rotor. Only the rigidity of the bearing support and speed are introduced as parameters of the unbalance measurement. Since rigidity is a machine parameter which, under normal circumstances, is subject to little change, the unbalance measurement is always carried out in the same manner with such a machine, independently of the rotor. This is, therefore, known as permanent calibration.

By applying permanent calibration, force-measuring balancing machines are able to perform the unbalance measurement, independently of the rotor, in one measuring run. This is one advantage over displacement-measuring machines, which have to be re-calibrated for each rotor type, thereby entailing an input of three measuring runs for one unbalance measurement.

In physical terms, the difference between the two machine types consists in the ratio of the rotor speed to the resonant frequency of the machine. Subcritically operated machines are of the force-measuring type and known as hard-bearing balancing machines; supercritically operated machines are of the displacement-measuring type and known as soft-bearing machines. There is no hard-and-fast line separating the two machine types. The faster a hard-bearing balancing machine is operated, the more it loses in terms of its force-measuring property and thus the option of rotor-independent permanent calibration. If said machine is also operated at faster speeds with permanent calibration, a systematic error, depending on the machine and the dynamic properties of the rotor, arises due to convergence with a critical resonance speed. The relative error of measurement is approximately the square of the frequency ratio of speed to resonant frequency.

As a threshold with a relative error of measurement of <10%, what is known as a "$Gn^2$" threshold is, therefore, specified for each permanently calibrated machine, which threshold is calculated from rotor mass G and speed n and must not be exceeded. The threshold corresponds to a resonance convergence of one third. If the product of the rotor mass and the square of the maximum measuring speed is greater than the specified $Gn^2$ threshold, then large errors of measurement may occur; permanent calibration is no longer viable.

BACKGROUND OF THE INVENTION

DE 40 28 656 A1 discloses a method which aims to use permanently calibrated force-measuring balancing machines to identify a convergence with a resonance speed which is too great and a thereby induced distortion in the measurement result. In this case, at least three unbalance measurements are determined at various measuring speeds during the unbalance-measuring run, from which measurements at least two differentials of the unbalance measurements which follow on from one another in terms of speed are formed by an evaluation circuit. If the evaluation circuit finds that the differentials between the neighbouring higher measuring speeds are proportionally greater than those between the neighbouring lower measuring speeds, a resonance step-up is found and signalled.

Furthermore, CN 1 02 175 394 A discloses a method for permanently calibrating a soft-bearing balancing machine, in which the resonant frequency of the oscillatory system comprised of the rotor bearing and measured rotor is calculated with reference to the frequencies and amplitudes of the rotor bearing which are measured during acceleration of the motor, and the influence of the rotor mass on the oscillation amplitude is described by imaging and the influence of the mass and speed of the rotor on the calibration is eliminated.

SUMMARY OF THE INVENTION

The object of the invention is to provide a method which corrects the systematic errors in permanent calibration and allows force-measuring balancing machines to perform a measurement which satisfies requirements in the event of a higher $Gn^2$ value and correspondingly greater convergence with the resonant frequency.

The object is achieved according to the invention by a method for correcting the empirically determined permanent calibration of a force-measuring balancing machine, in which method the resonant frequencies of the rotor to be balanced are calculated, in the measuring direction of sensing elements of a corresponding translatory direction and in a rotational direction about an axis which is perpendicular to the measuring direction and to the rotational axis of the rotor, from the mass of a rotor to be balanced, which is mounted in the balancing machine, the co-oscillating mass of the bearing supports, the rigidity of the bearing supports and the spacing of the rotor bearings of the bearing supports, and a frequency response calculated from the resonant frequencies and the rotor frequency is introduced to the permanent calibration.

The method according to the invention is advantageous in that the field of application of hard-bearing force-measuring balancing machines is essentially widened and, with equal error of measurement, a rotor can be measured at a higher, for example by a factor of 2 to 3, speed using a force-measuring balancing machine. The method is simple and can be carried out with little time investment. As regards the calculation for correcting the permanent calibration, aside from the speed, only machine parameters and the mass of the type of rotor to be balanced are required. The machine parameters need only be established once and can then be stored for all applications in a memory and removed therefrom. In practice, therefore, only the mass of each rotor needs to be established, and this can be obtained from the data on geometry and materials or by weighing the rotor. For the purpose of weighing the rotor, force measurement cells can also be arranged on the rotor bearings of the balancing machine.

DESCRIPTION OF THE DRAWING

The invention is described in more detail in the following, with reference to an embodiment shown in the drawing. The drawing shows the basic construction of a hard-bearing force-measuring balancing machine 1 for measuring the unbalance of a rotor 2 having the mass $m_R$, for example of a shaft. The rotor 2 is rotatably mounted in resilient bearing supports 3, having a rigidity c and a co-oscillating mass $M_s$, and can be driven in rotation by a powered drive 4. The drive 4 is connected to a control device 5 for setting and adjusting the drive speed. The frequency $\Omega$ of the rotor is detected by a frequency sensor 6 and sent to a device for processing and evaluating signals. Sensing elements 8 are fitted to the bearing supports 3 for each bearing plane and detect the dynamic effect of the rotor 2 on the bearing supports 3, for example using moving coils, in a set direction. The spacing of the bearing planes is denoted by L. The sensing elements 8 are connected via lines 9 and the frequency sensor 6 via a line 7 to a device 10 for processing signals. The measuring signals of the sensors 6, 8 are amplified and digitalised by the device 10 and then transmitted to an evaluation device 11, which comprises an electronic computer 12, programmed for evaluating signals, and a data memory 15 and is connected to an input apparatus 13. By means of the input apparatus 13, rotor-specific data, such as dimensions and data on shape, machine-specific data, such as co-oscillating mass and rigidity of the bearing supports, and location-specific data, such as spacings and location of the bearing and balancing planes, are supplied to the evaluation device 11 and stored for the calculations. The evaluation device 11 uses the measuring signals received from the sensors 6, 8 and set data to calculate one or more unbalance values requiring equalisation according to their absolute value and direction. The results of an evaluation calculation are displayed on a screen 14 connected to the computer 12.

The rotor carrier of a balancing machine is a system which is capable of oscillation and of which the dynamics can be described, as a first approximation, by the model of single-mass-oscillator having unbalance excitation. In this case, U denotes the imbalance, m the mass, c the resilient rigidity, $\Omega$ the angular frequency of the rotation and $\eta$ the frequency-response ratio:

$$\eta = \Omega \sqrt{\frac{m}{c}}.$$

The amplitude frequency of the oscillation excited by unbalance is expressed as:

$$\hat{x} = \frac{U}{m} \frac{\eta^2}{1-\eta^2} = \frac{U\Omega^2}{c} \frac{1}{1-\eta^2}$$

The trailing quotient can be developed into a Taylor series:

$$\frac{1}{1-\eta^2} = 1 + \eta^2 + \eta^4 + \eta^6 + \ldots \quad \eta < 1.$$

Where $\eta$ is very small, the higher powers play no role. The greater $\eta$ becomes, the more terms that have to be taken into account to approximate the operation. The force-measuring machine disregards the dependency of $\eta$. It assumes that displacements increase with $\Omega^2$. The error which is thus made is in the first order $\eta^2$. This means that, where the resonance convergence is 30%, the error is 9%, and where the speed is half of the resonant frequency, the error in the unbalance amplitude is 25%. To correct the error, the balancing machine requires further information. It needs to know the resonant frequency.

The equation for the unbalance measurement having two degrees of freedom is, in the symmetrical case, expressed as:

$$\begin{pmatrix} \omega_1^2 - \Omega^2 & \omega_1^2 - \Omega^2 \\ -\omega_2^2 + \Omega^2 & \omega_2^2 - \Omega^2 \end{pmatrix} \begin{pmatrix} x_1 \\ x_2 \end{pmatrix} = \Omega^2 \begin{pmatrix} \frac{2}{m}(u_1 + u_2) \\ \frac{L^2}{2\theta}(u_2 - u_1) \end{pmatrix}$$

with the resonant frequencies in the measuring direction of the sensing elements of a corresponding translatory direction $$\omega_1 = \sqrt{\frac{2c}{m}}$$

and in a rotational direction about an axis which is perpendicular to the measuring direction and to the rotational axis of the rotor $$\omega_2 = \sqrt{\frac{cL^2}{2\theta}}$$

The equation can be rewritten in the form of a matrix:

$$Q\vec{x} = \Omega^2 HKQ\vec{U}$$

with $$\vec{x} = \begin{pmatrix} x_1 \\ x_2 \end{pmatrix}$$

$$\vec{U} = \begin{pmatrix} U_1 \\ U_2 \end{pmatrix}$$

$$Q = \begin{pmatrix} 1 & 1 \\ -1 & 1 \end{pmatrix}$$

$$H = \begin{pmatrix} \frac{1}{1-\eta_1^2} & 0 \\ 0 & \frac{1}{1-\eta_2^2} \end{pmatrix}$$

$$K = \begin{pmatrix} \frac{1}{c} & 0 \\ 0 & \frac{1}{c} \end{pmatrix}$$

$$\eta_1 = \frac{\Omega}{\omega_1}$$

$$\eta_2 = \frac{\Omega}{\omega_2}.$$

Therefore, the relationship between the oscillation path and the unbalance is expressed as:

$$\vec{U} = \frac{1}{\Omega^2}(Q^{-1}HKQ)^{-1}\vec{x}$$

In this formulation, the frequency response H is separated from the machine parameter matrix K. In the limiting case of η against 0, H passes into the unit matrix. The formulation is comparable to the measurement equation of the permanent calibration $$\vec{U} = \frac{1}{\Omega^2}P\vec{x}$$

The permanent calibration matrix P corresponds to:

$$P^{-1} = Q^{-1}KQ.$$

Said matrix consists of the matrix of the machine parameters K transformed into the symmetrical coordinates. There is no frequency response H. The correction of the permanent calibration consists in re-introducing the frequency response H. In the present formulation, the calibration matrix P is derived directly from the machine model. In practice, this occurs empirically by means of calibration using trial runs. Nevertheless, the correction can be carried out in the same manner. The corrected permanent calibration matrix $P_k$ is calculated by offsetting the empirically determined permanent calibration P against the correction matrix H $$P_k^{-1} = Q^{-1}HQP^{-1}.$$

As regards correcting the permanent calibration, only H and, for this purpose, the resonant frequencies $\omega_1$ and $\omega_2$ are thus required. These need to be calculated for each rotor type of the machine-rotor-system. For the sake of simplicity, we may assume that the rotor is symmetrical and inertia radius of the rotor is $1/\sqrt{12}$ of the bearing spacing. This is the value of an elongated cylinder having the length of the bearing spacing. The operator needs to input only the mass of the rotor $m_R$ in order for the resonant frequencies $\omega_1$ and $\omega_2$ to be able to be calculated as follows:

$$\omega_1^2 = \frac{2c}{2M_s + m_R}$$

$$\omega_2^2 = \frac{2c}{2M_s + 4\frac{\theta_R}{L^2}}.$$

$M_s$ denotes the co-oscillating mass and c the rigidity of the bearing support. The moment of inertia of the rotor, which is transverse to the rotational axis $\theta_R$ can be taken to be:

$$\theta_R = \frac{m_R L^2}{12}$$

Under normal circumstances, in which the rotor does not protrude to a great extent, the inertia radius of the rotor $\sqrt{\theta_R/m_R}$ is less than half of the bearing spacing. In this case, $\omega_2 > \omega_1$; that is, the translatory resonant frequency is the lowest and the correction of the resonance convergence in the rotational direction is smaller. This means that in this case correct specification of the mass $m_R$ is more important than correct specification of the moment of inertia.

The bearing support rigidity c and the co-oscillating mass $M_s$ are machine constants which need be determined only once for each machine (or machine type), in order for it to be possible to calculate the matrix H and to correct the permanent calibration. The machine constants are established from the run-up curves of two run-ups using a symmetrical test rotor up to approximately 80% of the resonance speed. In the first run, the test rotor has no introduced unbalance; in the second, a static test unbalance is applied. The particle velocity is measured at the two bearing supports 3 using moving coils which take relative and absolute measurements as sensing elements 8. The machine parameters c and $M_s$ are calculated from the measured particle velocities and from the value of the test unbalance and deposited in the memory 15 of the computer 12. The computer 12, which has been programmed according to the described method, accesses the machine parameters c and $M_s$ and the input mass $m_R$ of the rotor 2, and accordingly corrects the permanent calibration on each evaluation calculation.

What is claimed is:

1. Method for correcting the empirically determined permanent calibration of a force-measuring balancing machine for measuring imbalance of a rotor rotatably mounted in the balancing machine in bearing supports having fitted sensing elements, the rotor having a rotor mass, the bearing supports having bearing support mass co-oscillating with the rotor mass, a selected stiffness, and rotor bearings having a selected spacing, comprising the steps of calculating resonant frequencies of the rotor to be balanced, in a translatory direction corresponding to a measuring direction of the sensing elements and in a rotational direction about an axis which is perpendicular to the measuring direction and to a rotational axis of the rotor, from the rotor mass of the rotor to be balanced, the co-oscillating bearing support mass of the bearing supports, the stiffness of the bearing supports and the spacing of the rotor bearings of the bearing supports, and introducing to the permanent calibration a frequency response calculated from the resonant frequencies and the rotor frequency.

2. Method according to claim 1, wherein the permanent calibration is established in the form of a calibration matrix P and, using a correction matrix H, which describes the frequency response, according to the formula:

$$P_k^{-1} = Q^{-1}HQP^{-1},$$

is offset with respect to the corrected permanent calibration matrix $P_k$, the matrix Q being $$Q = \begin{pmatrix} 1 & 1 \\ -1 & 1 \end{pmatrix}$$

and the correction matrix H being calculated from the frequency of the rotor to be balanced and the calculated resonant frequency.

3. Method according to claim 1 wherein the correction matrix is calculated according to the following formula:

$$H = \begin{pmatrix} \dfrac{1}{1-\eta_1^2} & 0 \\ 0 & \dfrac{1}{1-\eta_2^2} \end{pmatrix}$$

wherein $$\eta_1 = \frac{\Omega}{\omega_1} \text{ and } \eta_2 = \frac{\Omega}{\omega_2}.$$

4. Force-measuring balancing machine comprising resilient bearing supports, to which are fitted sensing elements which detect the dynamic effect of a rotor on the bearing supports, comprising a frequency sensor which detects the frequency of the rotor, and comprising an evaluation device which, for the purpose of signal evaluation, has an electronic computer having been programmed by means of an empirically determined permanent calibration process and a data memory containing the empirically determined machine parameters of stiffness and co-oscillating mass, wherein the electronic computer has a program for correcting the empirically determined permanent calibration process according to the method according to any of the preceding claims.

* * * * *